July 6, 1965     A. O. G. ERNST ETAL     3,193,218
AUTOMATIC TRANSITION-CONTROL DEVICE FOR V.T.O.L. AIRCRAFT
Filed March 19, 1962     4 Sheets-Sheet 1
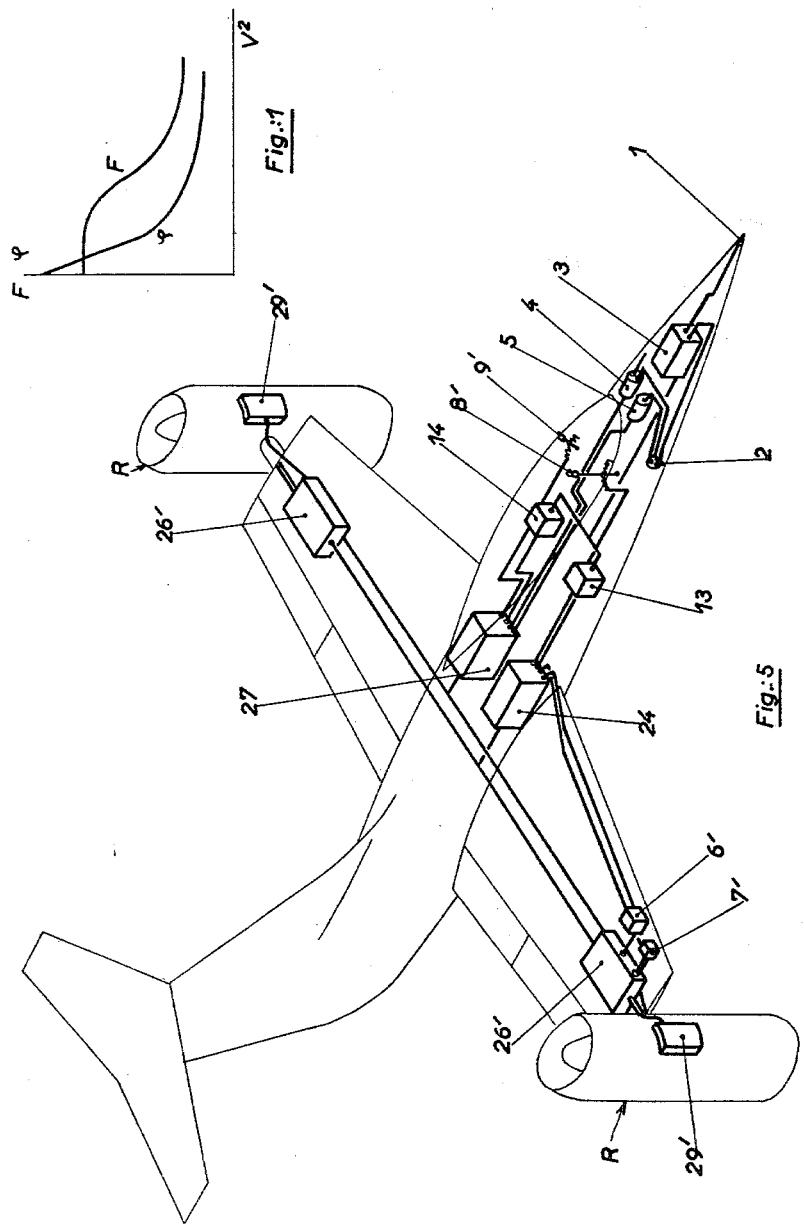
INVENTORS
Adolphe O. G. Ernst
Jean P. J. Gardinier
Gaston Rosa
By Watson, Cole, Grindle & Watson
ATTORNEYS July 6, 1965  A. O. G. ERNST ETAL  3,193,218
AUTOMATIC TRANSITION-CONTROL DEVICE FOR V.T.O.L. AIRCRAFT
Filed March 19, 1962  4 Sheets-Sheet 2
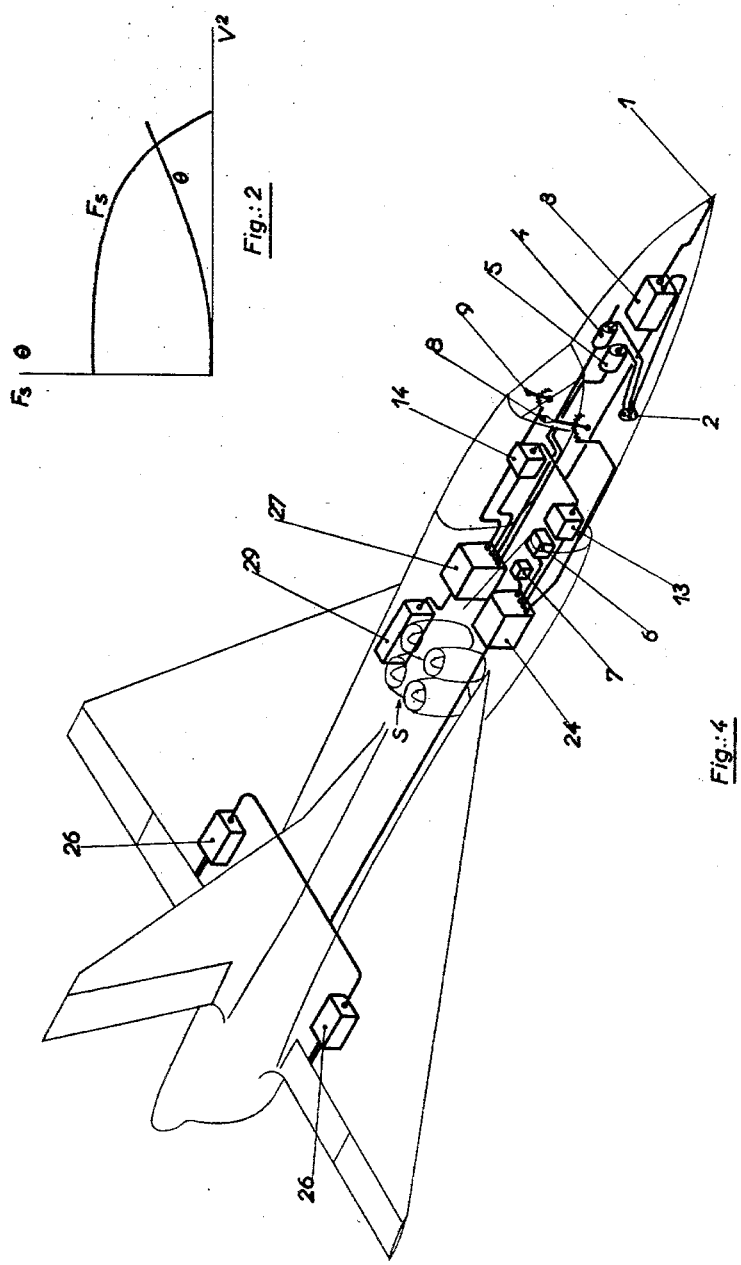
INVENTORS
Adolphe O. G. Ernst
Jean P. J. Jardinier
Janos Róna
By Watson, Cole, Grindle & Watson
ATTORNEYS July 6, 1965   A. O. G. ERNST ETAL   3,193,218
AUTOMATIC TRANSITION-CONTROL DEVICE FOR V.T.O.L. AIRCRAFT
Filed March 19, 1962   4 Sheets-Sheet 3
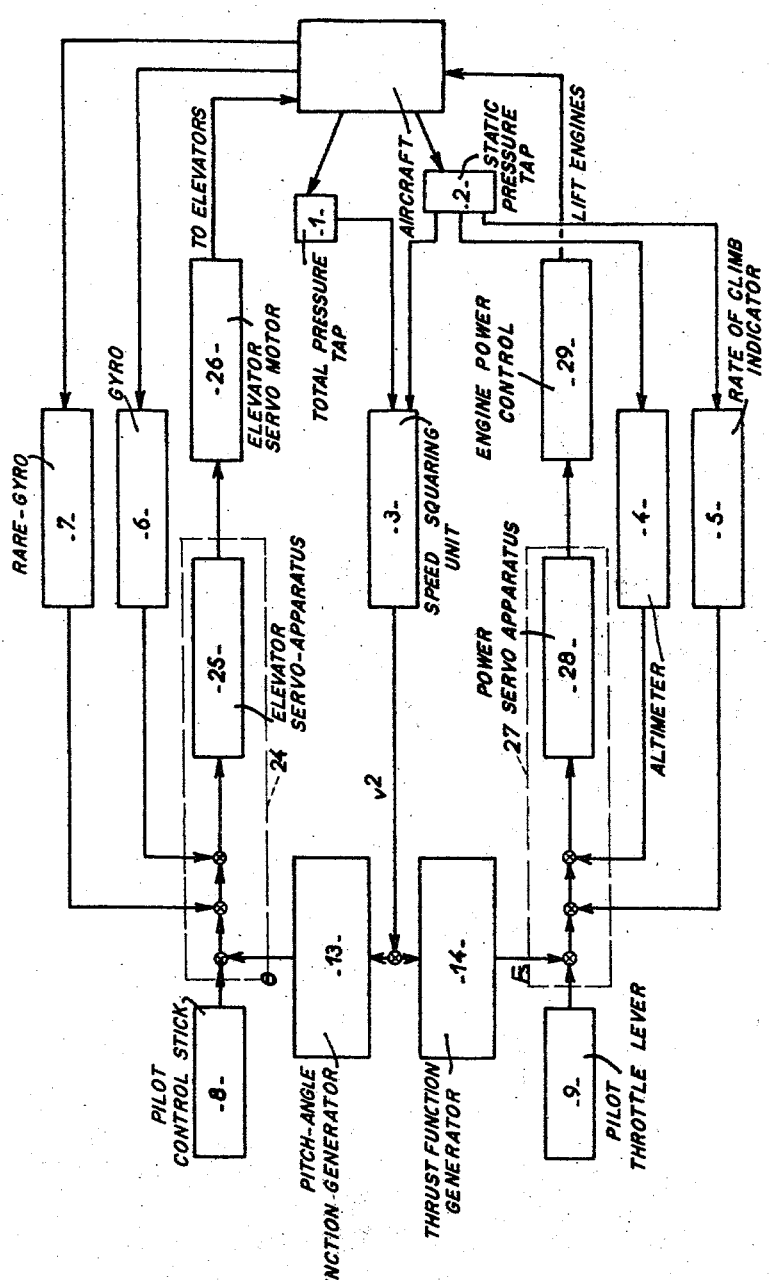
Fig.: 3

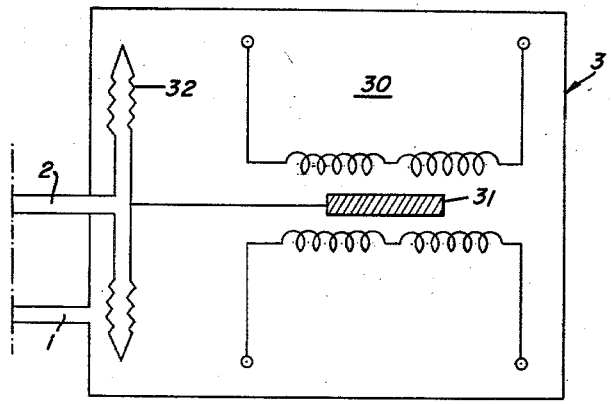
FIG.6
FIG.7
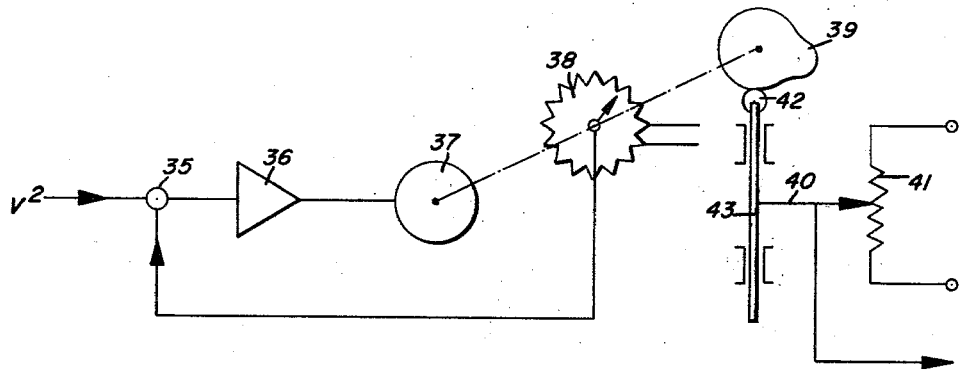

United States Patent Office 3,193,218
Patented July 6, 1965

3,193,218
AUTOMATIC TRANSITION-CONTROL DEVICE
FOR V.T.O.L. AIRCRAFT
Adolphe Otton Gontier Ernst, Bois-le-Roi, Seine, Jean
Paul Joseph Jardinier, Vitry-sur-Seine, and Janos Rona,
Dammarie-les-Lys, Seine and Marne, France, assignors
to Societe Nationale d'Etude et de Construction de
Moteurs d'Aviation, Paris, France, a company of France
Filed Mar. 19, 1962, Ser. No. 180,477
Claims priority, application France, Mar. 23, 1961,
856,589
4 Claims. (Cl. 244—76)

Aircraft of the so-called V.T.O.L. type which take-off and land vertically pass, before landing, through a transitory phase of flight during which they change from horizontal flight to hovering. During this transition, the speed of flight diminishes until it becomes zero and the vertical component of the thrust increases so as to compensate for the reduction in the aerodynamic lift of the wings. In hovering as the aerodynamic forces are null, the lift is ensured solely by the engine group which then works at full power, since it alone must balance the weight of the aircraft.

In order to carry out the landing operation correctly, the pilot must necessarily vary simultaneously and accurately the direction of the resultant thrust of the propulsion group, together with the value or magnitude of the thrust, while continuing to carry out the many other duties involved in the piloting of the aircraft, which makes his task particularly difficult. Variation of the direction of the thrust is obtained, depending on the type of V.T.O.L. aircraft, by modification of the angle $\phi$ made by the axis of thrust with the horizontal, without changing the attitude of the aircraft, or by modification of its angle of pitch $\theta$ (angle made by the longitudinal axis of the aircraft with the horizontal); the variation of the magnitude F of the thrust is obtained by action on the throttle lever through the intermediary of the usual regulation of the propulsion group.

The laws governing these various parameters and corresponding to a correct landing operation can be established with accuracy by taking account of the characteristics of the aircraft.

FIG. 1 shows the shape of the curves of $\phi$ and of F as a function of the square of the speed of translation $v$ of the aircraft, the latter being of the type having a thrust axis orientatable with respect to the airframe (aircraft with jet engines mounted on tilting wings, aircraft with fixed wings but having tilting jet engines, aircraft with fixed reactors equipped with orientatable nozzles or having a directional effect). It will be observed that with this type of aircraft, the magnitude of thrust F increases from the value of the cruising power in horizontal flight at high speed until it finally balances the weight of the aircraft, while the angle $\phi$ of the axis of thrust with the horizontal also increases progressively up to the vicinity of 90°, which value is reached when the speed $v$ falls to zero.

FIG. 2 shows similar curves in the case of aircraft with special lift devices supplying a thrust $F_s$ (aircraft with lift rotors embedded in the wings or having a separate group of jet engines or vertical lift ejectors). In this case, the magnitude of thrust $F_s$, which should balance the weight of the aircraft during hovering, is almost zero for normal flight at high speed, the wings then providing the necessary lift and the propulsion thrust being supplied by the propulsion jet or jets. The angle of pitch $\theta$ decreases in turn from a certain value during horizontal flight, and falls to zero at the same time as the speed $v$.

In both cases, we are concerned with V.T.O.L. aircraft retaining substantially the same attitude during normal horizontal flight and during take-off or landing vertically. The present invention is more particularly applicable to this kind of V.T.O.L. aircraft.

The present invention has for its object an automatic device for controlling the transitory phase of flight preceding a vertical landing, this device carrying out rapidly and accurately the control operations required to give the aircraft a substantially horizontal and straight-line trajectory, thus reducing the fuel consumption and relieving the pilot, who can devote his attention to other tasks.

The automatic control device according to the invention comprises essentially two cams or other suitable members which respectively embody the predetermined curves of variation of the direction of the resultant thrust and of the magnitude of the thrust as a function of the speed of translation of the aircraft, or preferably of the square of the said speed, this latter value suitably detected or worked out determining the positions of the said cams and in consequence, the supply of signals for controlling the direction and the magnitude of the thrust, the function generator thus produced being completed by an appropriate feed-back servo system.

The description which follows below with reference to the accompanying drawings, given by way of example only and without implied limitation, will make it quite clear how the invention may be carried into effect, the special features which are brought out either in the text or in the drawings being understood to form part of the said invention.

FIGS. 1 and 2 show the curves of which an explanation has been given above.

FIG. 3 is a block diagram of an automatic control device in accordance with the present invention.

FIG. 4 is a view of the device in perspective, showing the arrangement of the various parts of the device in a V.T.O.L. aircraft cell with special lift devices comprising an independent group of vertical jet engines.

FIG. 5 is a similar view of a V.T.O.L. aircraft of a different type, this aircraft comprising tilting power units carried by the wings.

FIGS. 6 and 7 show diagrammatically details of the arrangement.

In FIGS. 3 and 4, there have been shown at 1 and 2, sensing probes for total pressure and static pressure which supply a central speed station 3 with the parameters which permit of the preparation of a signal proportional to the square of the speed of forward movement of the aircraft, the static pressure sensing probe 2 being furthermore associated with an altimeter 4 and with a variometer 5. The jet engine tail pipe in FIG. 4 exemplifies a suitable forward propulsion means for causing such forward movement of the aircraft. It can furthermore be seen that a gyroscope and a rate-gyro are provided at 6 and 7, at 8 the control stick and at 9 the throttle lever for the lifting power group S. All these devices are included in currently-provided installations on board aircraft.

The speed station 3 may be for example of the known type comprising a differential transformer 30 (see FIG. 6) having a movable core 31 coupled to a pressure capsule 32 subjected to the difference between the total and static pressures respectively detected by 1 and 2. The operation of a differential transformer of this kind is described in the French Patent No. 1,271,552, issued on August 7, 1961.

In accordance with the present invention, the speed station 3 supplies two function generators 13 and 14, which respectively prepare signals proportional to the values of the angle $\theta$ of the sustaining jet engines S substantially about the horizontal pitch axis of the aircraft and of the lifting thrust $F_s$ of the several jet engines S, as a function of the square of the speed $v$ of the aircraft, following the pre-established laws shown in FIG. 2.

The practical construction of the function generator does not present any problem to a specialist, who has available for that purpose a large number of solutions. By way of indication only, one possible form of construction of the function generator will be briefly explained.

The signal $v^2$ coming from the speed station 3 is transmitted through the intermediary of a discriminator 35 (see FIG. 7) to an amplifier 36 which energizes an electric motor 37 driving on the one hand the slider of a potentiometer 38 coupled by a feed-back loop to the discriminator, and on the other hand a cam 39, the profile of which incorporates the law $\theta$ $(v^2)$ in the case of the pitch function generator 13, and $F_s$ $(v^2)$ in the case of the thrust function generator 14. The rotation of the motor 37 continues until the voltage supplied by the potentiometer 38 balances the signal $v^2$ applied to the discriminator 35. There is thus obtained an angular displacement of the motor 37 and therefore a new position of the cam 39, which depends on the value of the signal $v^2$. To this angular position of the cam 39, there will correspond a position of the slider 40 along the potentiometer 41, by means of an adequate coupling constituted by a cam-follower 42–43. The signal collected at the output of the function generator will be the expression of $\theta$ or $F_s$, depending on the case.

Reverting to the diagrams of FIGS. 3 and 4, the signal $\theta$ delivered by the pitch function generator 13 is applied to one of the inputs of an amplifier unit 24, which also receives the signals derived from the gyroscope 6, the rate-gyro 7 and the control stick 8. This unit, which comprises a servo-apparatus 25, transmits the desired signal to the actuating means or actuators 26 which operate the elevators of the aircraft. In the same way, the signal $F_s$ delivered by the thrust function generator 14 is applied to an amplification unit 27 analogous to that above, and also comprising a servo-apparatus 28; this latter unit however, which receives in addition to the signal $F_s$, those which are derived from the altimeter 4, the variometer 5 and the engine throttle lever 9, is connected to the power control 29 of the lift group S.

The V.T.O.L. aircraft shown in FIG. 5 differs from that described above in that the transition from normal horizontal flight to stationary flight is effected by progressively tilting the sustaining jet engines or propulsion units R mounted on the wings about a horizontal axis normal to the thrust of said engines; these jet engines (which also constitute the forward propulsion means) could furthermore be fixed on the wings and the desired result is then obtained either by tilting the wings or by deflecting the jet by means of orientatable discharge nozzles or discharge nozzles having a directional effect.

The automatic landing control device for the V.T.O.L. aircraft of this latter type is similar to that which has been described for the previous case with reference to FIGS. 3 and 4. In FIG. 5 furthermore, the same reference numbers have been employed to designate the same members as before and reference numbers with an apostrophe are used to designate those members which are different but similar.

Thus, 8′ represents the control handle for varying the inclination of the jet units R, 9′ is the throttle lever for these latter, 6′ and 7′ are detectors of angular position and of variation of that angular position, and 26′ are the actuators or actuator means under the control of the servo-apparatus for controlling the angular movement or inclination of the jet units. It will be understood that in this case, the function generators 13 and 14 work out, from $v^2$, the values $\phi$ and F respectively which are applied to the amplifying units 24 and 27 controlling the actuators 26′ and the engine power control 29′ for the jet units.

It will be understood that modifications may be made to the forms of embodiment which have been described above, in particular by the substitution of equivalent technical means, without thereby departing from the scope of the present invention.

What we claim is:

1. An automatic transition control device for flat-riser V.T.O.L. jet aircraft of the class employing forward propulsion means and including sustaining jet engines carried by said aircraft for creating sustaining jets angularly movable in vertical planes parallel to the forward propulsion of said aircraft, said jet engines including power control means for varying the magnitude of their thrust, said control means comprising an aircraft speed squaring unit adapted for producing a first signal proportional to the square of the forward aircraft speed, means to which said first signal is applied, generating a thrust-axis control signal which is related to said first signal in accordance with a predetermined law, further means to which said first signal is simultaneously applied generating a thrust-magnitude control signal which is related to said first signal in accordance with a predetermined law, a positioning servo-apparatus responsive to said thrust-axis control signal, and actuator means controlled by said apparatus for angularly moving the jets of said sustaining jet engines in response to changes in said forward aircraft speed, and a power servo apparatus responsive to said thrust magnitude control signal for controlling said power control means to vary the thrust magnitude of such sustaining jet engines in response to changes in said forward aircraft speed.

2. Device as claimed in claim 1, wherein the signal generating means comprise cams respectively embodying predetermined curves of variation of the thrust axis and thrust magnitude as a function of the square of the forward aircraft speed, cam servo-control means responsive to the first signal for adjusting the position of each of said cams in accordance with said first signal, and cam-follower means associated with each of said cams for producing respectively thrust-axis control signals and thrust-magnitude control signals depending on the position of the respective cams.

3. Device as claimed in claim 1, applicable to jet aircraft of the type having jets orientable with respect to the airframe, in which device the signal generating means respectively embody curves of variation of the angular deviation from the horizontal of said orientable jets and of the engine thrust as a function of the square of the forward aircraft speed.

4. Device as claimed in claim 1, applicable to jet aircraft of the type having special jet lift engines incorporated within the airframe, in which device the signal generating means respectively embody curves of variation of the aircraft pitch angle and of the lift engine thrust as a function of the square of the forward aircraft speed.

References Cited by the Examiner

UNITED STATES PATENTS

| 2,943,822 | 7/60 | Hamilton | 244—76 |
| 2,945,649 | 7/60 | Metcalf et al. | 244—76 |
| 2,953,327 | 9/60 | Clement et al. | 244—77 |

MILTON BUCHLER, *Primary Examiner.*

ANDREW H. FARRELL, *Examiner.*